United States Patent
Chou

(10) Patent No.: US 7,128,415 B2
(45) Date of Patent: Oct. 31, 2006

(54) METHOD OF FORMING POLARIZED OR PHOTOCHROMIC LENSES BY FUSING POLYCARBONATE WITH OTHER PLASTIC MATERIALS

(75) Inventor: Sloan Chou, Taoyuan (TW)

(73) Assignee: Polylite Taiwan Company, LTD, Taipei (TW)

( * ) Notice: Subject to any disclaimer, the term of this patent is extended or adjusted under 35 U.S.C. 154(b) by 0 days.

(21) Appl. No.: 10/837,403

(22) Filed: Apr. 30, 2004

(65) Prior Publication Data

US 2005/0243274 A1 Nov. 3, 2005

Related U.S. Application Data

(60) Provisional application No. 60/466,719, filed on Apr. 30, 2003.

(51) Int. Cl.
G02C 7/02 (2006.01)

(52) U.S. Cl. .................. 351/177; 351/49; 351/163; 264/1.32

(58) Field of Classification Search ........ 351/162–163, 351/165, 177, 44–45, 49; 65/30.1, 30.11; 428/411.1, 412; 264/1.1, 1.7, 2.5–2.7, 1.31, 264/1.32; 359/483, 485
See application file for complete search history.

(56) References Cited

U.S. PATENT DOCUMENTS

| | | | |
|---|---|---|---|
| 527,495 A | 10/1894 | Hubbell | |
| 4,755,424 A | 7/1988 | Takeoka et al. | |
| 4,904,525 A | 2/1990 | Taniguchi et al. | |
| 4,931,125 A | 6/1990 | Volkmann et al. | |
| 5,109,210 A | 4/1992 | Boudet et al. | |
| 5,270,745 A | 12/1993 | Pedrono | |
| 5,454,469 A | 10/1995 | Budny et al. | |
| 5,458,820 A * | 10/1995 | Lefebvre | 264/1.7 |
| 5,488,442 A | 1/1996 | Harisigny et al. | |
| 5,531,940 A * | 7/1996 | Gupta et al. | 264/1.7 |
| 5,589,024 A | 12/1996 | Blake | |
| 5,922,161 A | 7/1999 | Wu et al. | |
| 6,060,001 A | 5/2000 | Welch et al. | |
| 6,065,836 A | 5/2000 | Krishnan et al. | |
| 6,150,430 A * | 11/2000 | Walters et al. | 522/79 |
| 6,154,294 A * | 11/2000 | Craig et al. | 358/483 |
| 6,177,032 B1 | 1/2001 | Smith et al. | |

(Continued)

OTHER PUBLICATIONS

"Design Guide for Bonding Plastics", Loctite Literature, The Loctite Design Guide for Bonding Rubber and Thermoplastic Elastomers 1997-2000 www.loctite.com/literature_html/design_plastic_center.html).

(Continued)

Primary Examiner—Jordan M. Schwartz
(74) Attorney, Agent, or Firm—Merchant & Gould

(57) ABSTRACT

The invention provides techniques for making polycarbonate or plastic lenses. In one exemplary embodiment, for example, an electrical discharge is applied to a polarized film surface and a treatment applied on the polarized film to make a glue card. An adequate amount of adhesive glue is spread between the polarized film glue card and a polycarbonate lens, and a one-unit lens is formed by photochemical reaction technology. Thermosetting monomer is poured between the unit lens and a glass mold, and heated evenly to create a solid one-piece lens. The thermosetting monomer may be a photochromic or transparent monomer. These or substantially similar techniques may be used to produce polycarbonate polarized lenses, polycarbonate photochromic lenses, polycarbonate photochromic polarized lenses, plastic polarized lenses, plastic photochromic lenses, and plastic photochromic polarized lenses.

14 Claims, 2 Drawing Sheets

U.S. PATENT DOCUMENTS

| | | | |
|---|---|---|---|
| 6,256,152 B1 | 7/2001 | Coldrey et al. | 359/642 |
| 6,328,446 B1 | 12/2001 | Bhalakia et al. | |
| 6,355,124 B1 | 3/2002 | Blomberg et al. | |
| 6,367,930 B1 | 4/2002 | Santelices et al. | |
| 6,432,246 B1 | 8/2002 | Blake | |
| 6,436,525 B1 | 8/2002 | Welch et al. | |
| 6,506,488 B1 | 1/2003 | Stewart et al. | |
| 6,531,076 B1 | 3/2003 | Crano et al. | |
| 6,886,937 B1 * | 5/2005 | Moravec et al. | 351/165 |
| 2004/0227995 A1 * | 11/2004 | Gettens | 359/490 |

OTHER PUBLICATIONS

European Search Report from European Patent Office dated Mar. 9, 2005.

Partial European Search Report from European Patent Office dated Dec. 10, 2004.

\* cited by examiner

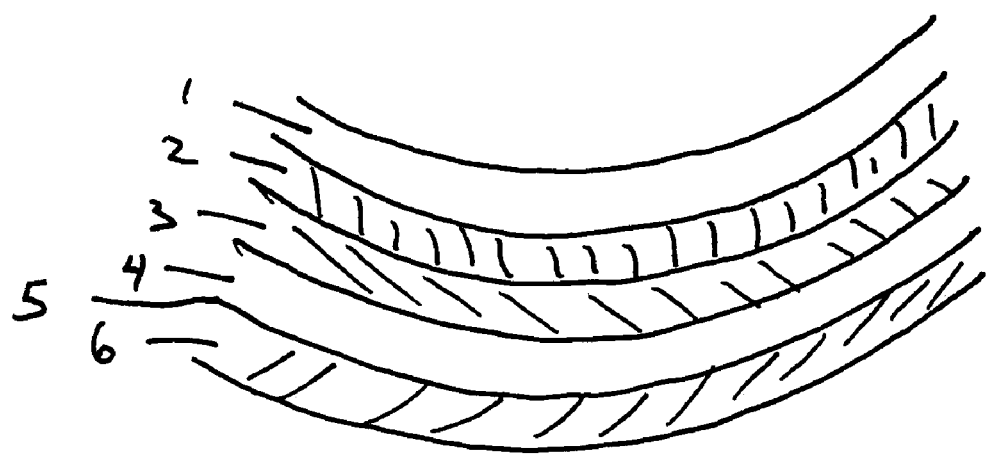
Fig.1
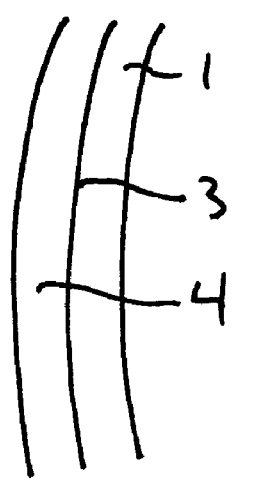 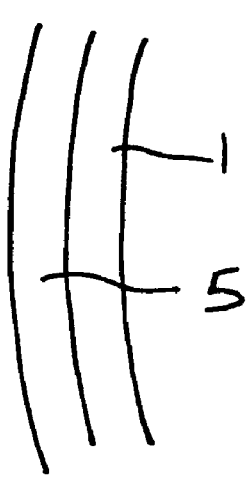 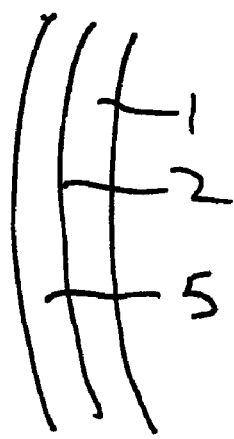
Fig.2　　Fig.3　　Fig.4
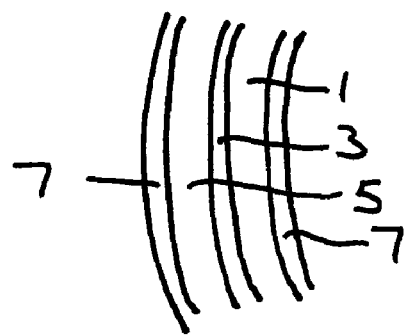
Fig.5

METHOD OF FORMING POLARIZED OR PHOTOCHROMIC LENSES BY FUSING POLYCARBONATE WITH OTHER PLASTIC MATERIALS

CROSS-REFERENCE TO RELATED APPLICATION

This application claims priority from provisional application No. 60/466,719, filed Apr. 30, 2003, entitled METHOD OF FORMING POLARIZED OR PHOTOCHROMIC LENSES BY FUSING POLYCARBONATE WITH OTHER PLASTIC MATERIALS.

FIELD OF THE INVENTION

The present invention relates generally to methods of bonding thermosetting and thermoplastic materials together to produce a single solid polarized and/or photochromic optical lens in polycarbonate. More particularly, the present invention provides methods for surface treating the plastic materials to promote effective bonding and provide improved optic properties.

BACKGROUND OF THE INVENTION

Sunlight is a mixture of vertical and horizontal wavelengths of light. A polarized lens selects either wavelength of light, vertical or horizontal, to pass through, and blocks the other wavelength. Thus, the reflection or glare from water surfaces, concrete roads, metal object, etc., will be significantly reduced by a polarized filter. Without the polarization function sunglasses only reduce the total amount of light transmitted therethrough but do not function to filter vertical or horizontal wavelengths to reduce glare.

Conventional polarized plastic lens typically are manufactured by one of the following methods. In one method, flat polarized film typically made of polyvinyl alcohol (PVA) is packed with or without an adhesive with triacetate cellulose, or polycarbonate thin layer, cut to shapes and sizes and then formatted to given curves. Advantages of this process are that it is an easy process to perform and is relatively low cost. Weaknesses of this process are that it produces a relatively unstable optic curve, the lens is easy to scratch, no power correction lens is currently able to be produced, and the material is highly moisture absorptive which leads to the deterioration of anti-glare function in a short period.

In a second method, a so called "sandwich" method is used to laminate a formatted polarized film between two lenses. Advantages of this process are that it is able to produce power correction lens and a hard coating can be applied on the lens surface. However, because air can be introduced during the lamination process bubbling and foaming at the faces of the materials can result and the polarized lens is easily delaminates or separated during the lens edging process or lens wearing period.

In a third method a curved PVA films are incorporated directly in injection molding of acrylic or polycarbonate (thermoplastic polymers) or incorporated in the casting (polymerization) of thermosetting monomers. Advantages of this method are that it an easy process to perform and it can produce lenses with power and hard coating. Weaknesses of this method are that the cost needed for manufacturing set up is relatively high and yield is relatively low, mainly due to material stress, uneven color density and distortion of PVA film inside the lens.

The abovementioned direct molding method and casting method often make the inserted polarized film in an unstable position in the molds and as a result reflect a wave from optic vision; consequently, these methods can generate an unwanted prism power and poor optic function.

The conventional plastic polarized lenses currently marketed have less than optimal resistance to heat and moisture, which leads often to deterioration of anti-glare function after a short period of wearing. This occurs because the polarized film may not be protected and/or isolated by suitable plastic materials completely. Moreover, the conventional plastic polarized lens, compared to those made of the mineral glass, has lower abrasion hardness and resistance. In addition, both conventional plastic and mineral glass polarized lens have poor impact resistance. The polarized lens is very suitable to wear outdoor activities and sport purpose; however, there are few lenses which offer superior impact-resistance function.

It would be desirable to have a method of forming a polarized lens that not only can use polycarbonate materials (by bonding two completely different resin materials between thermoplastic and thermosetting), but also can offer scratch resistance and superior impact resistance.

Conventional polycarbonate (thermoplastic polymer) or plastic (thermosetting monomer) photochromic lenses are made by either inclusion of an organic photochromic dye throughout the resin material or by the Trans-Bonding™ or imbibition (i.e., the absorption of a liquid by a solid or gel) method, where photochromic dye is driven into the front surface of the lens. The amount of light transmittance through the lens will be activated through the UV (ultraviolet) light exposure. The higher the UV light exposure the lower the amount of light transmittance to shade the light (activation of photochromic dyes), and vice versa.

Bonding thermoplastic materials, such as polycarbonates used in lenses as the power portion, to thermosetting materials, such as photochromic monomers is challenging, if it is done outside of the molding process. Molding methods are done at temperatures so high as to typically destroy or diminish the activation function of the photochromic dye inclusion in the polycarbonate resin. One photochromic polycarbonate lens currently commercially available made by the Trans-Bonding™ method is available as Transition™ lenses polycarbonate from Transitions Optical, Inc., SOLA International, Essilor, Younger Optics, and the like.

It would be desirable to produce a photochromic lens in a thermosetting material which can be built on a polycarbonate lens while retaining optical photochromic activity. It would be desirable to have a method of using the photochromic monomer to build upon a polycarbonate lens to manufacture a high optic quality of significantly less inner stress fused polycarbonate photochromic lens as well as fused polycarbonate photochromic polarized lens. It would also be desirable to have a method that would similarly produce a polarized polycarbonate ophthalmic lens.

SUMMARY OF THE INVENTION

The present invention provides a method of surface treatment to firmly bond the different thermoplastic and thermosetting plastic materials interfaces. Broadly stated, polymerization of monomer in the oven strengthens the crosslinking among plastic materials and polycarbonate lens.

Accordingly, one exemplary embodiment of the present invention provides a method of producing a polarized and/or photochromic ophthalmic lens, comprising: providing a PVA film having a first and second side; applying an electrical discharge; applying an adhesive to both sides of the PVA film of and allowing the material to dry; providing a thermoplastic material lens having a first and second side; applying an electrical discharge to one side of the thermoplastic lens; applying a thermosetting monomer and polymerized; and, casting the thermosetting material and the thermoplastic material lens of to form a polarized and/or photochromic polycarbonate lens.

A method according to one exemplary embodiment of the present invention to produce a plastic polarized lens comprises first using an electrical discharge unit to treat the substrate surface. The method also includes a special treatment to discharge the surface of PVA polarized film and apply glue and cure with photo-chemical technology to make a PVA polarized glued card. A proper adhesive is spread between PVA polarized glued card and polycarbonate lens to form a lens unit (one piece) by photo-chemical technology. The PVA polarized glued card can be steadily and equally to adhere to the polycarbonate lens front curve. This actual curve will provide the optic quality functionality. Using the above-mentioned lens unit as back mold I and setting on front glass mold II, monomer is poured between these two molds and heat as per controllable program until it becomes a single solid piece. The polymerized monomer will become a thin layer on top of the PVA polarized glue card to protect polarized films as well as bond firmly with the polycarbonate materials. Strictly speaking, a thermosetting material built up a herewith, is rather a protection and bonding layer instead of a front lens. The correct power and lens material is dominant by above-mentioned lens unit (see mold I). The above monomer can use any kind of thermosetting materials, in addition to clear monomer, such as photochromic monomer, to manufacture photochromic polycarbonate lens or photochromic polarized polycarbonate lens. It is to be understood that this lens unit can be replaced by other kinds of cast plastic lenses to bond with above polymerized monomer constitutes a single solid lens and forms a non-polycarbonate polarized lens or non-polycarbonate photochromic polarized lens.

The present invention also provides a lens produced by the abovestated method.

The high inner stress in injection lens due to high temperature and pressure in molding process which may lead to optic distortion. In particular, if the injection lens is viewed under polarized light, it will show obviously the inner stress. With the combination of thermosetting plastic, the polycarbonate polarized lens will lower the inner stress since the lens wearer will see through mainly the front thermosetting plastic instead of polycarbonate. The thicknesses of the front side, made of other thermosetting plastic materials, are between about 0.05 mm and about 1.2 mm (depending on monomer function). Therefore, the thickness of the polycarbonate lens (back side) will still at least maintain its minimum of about 1.2 mm in order to offering the benefit of impact resistance from polycarbonate lens.

In the present invention, the polycarbonate lens plus a PVA glued card is used as the back glass mold, i.e., the lens unit Mold I. Hence, in this method, there is no need for the additional back glass mold direct casting methods as explained in the above.

The present invention provides a method of producing polycarbonate photochromic lens instead of using the polycarbonate lens surface Trans-Bonding™ method.

The present invention also provides a method of producing various design lenses, such as, but not limited to, single vision lens, bifocal lens, multi-focal lens, progressive lens and the like by using different front glass mold designs.

In the present invention, it is also feasible to produce the above process in the opposite direction by using front side lens to bond with a backside PVA polarized film and form lens unit as Mold II, and then pouring monomer polymerization at backside with glass Mold I. Particularly, this method can efficiently produce nearly any kind of polarized or photochromic polarized plano lens.

Preferably, the hard coating is applied on both concave and convex side of polycarbonate polarized and/or photochromic lens. A back side antireflective ("AR") coating on polarized lens is highly recommended.

Other features and advantages of the present invention will become apparent upon reading the following detailed description of embodiments of the invention, when taken in conjunction with the appended claims.

BRIEF DESCRIPTION OF THE DRAWINGS

The invention is illustrated in the drawings in which like reference characters designate the same or similar parts throughout the figures of which:

FIG. 1 shows a schematic side view of a polarized PVA glued card to bond with polycarbonate lens (backside) and polymerized monomer (front side) of one exemplary embodiment of the present invention.

FIG. 2 shows a schematic side view of a polycarbonate polarized lens.

FIG. 3 shows a schematic side view of a polycarbonate photochromic lens.

FIG. 4 shows a schematic side view of a polycarbonate photochromic and polarized lens.

FIG. 5 shows a schematic side view of a hard coated polycarbonate polarized lens.

DETAILED DESCRIPTION OF THE EMBODIMENTS

Figure 6:
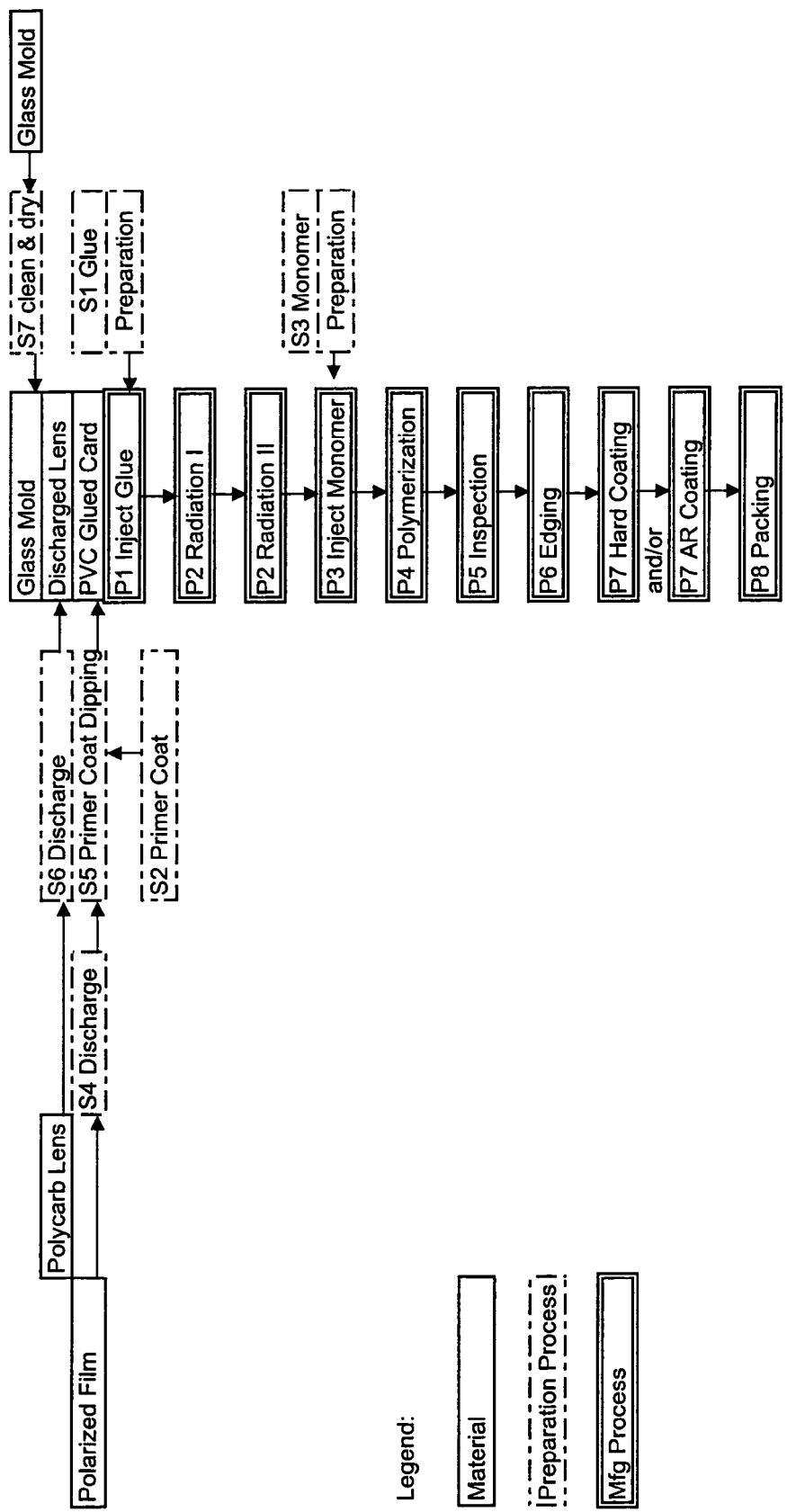
FIG. 6 is a process flow diagram of one exemplary method of the present invention.

The thermosetting plastic material of the present invention preferably is a monomer having molecules which arrange themselves in a three dimensional structure during polymerization and which result in a polymer that neither appreciably softens nor bends when heated. Exemplary materials include, but are not limited to, diallyl phthalate and allyl diglycol carbonate (n=1.60) (for example, but not a limitation, CR-39, a petroleum derivative of a polyester group of a polymerizable thermosetting resin, which has an index n=1.499). Less diluted diallyl phthalate like the above (n=1.56), can be used. Another example is 2.2*bis[4-(methacryloxydiethoxy)phenyl]propane, (n=1.55–1.56). The refractive index depends on the mixture of CR-39 monomer amount present.

The thermoplastic material of the present invention has molecules arranged in long linear chains (two dimensions) and when heated, soften and can be compressed. The thermoplastic material can be a number of different polycarbonate structures, such as, but not limited to, those materials disclosed in U.S. Pat. No. 6,367,930, issued to Santelices et al. Polycarbonates are available from such companies as Bayer, General Electric and Teijin. Homopolycarbonates, copolycarbonates, methyl-methacrylates, mixtures thereof and the like can be used.

The photochromic material used in the present invention can be a thermosetting resin polyurethane (TPU) and a photochromic compound associated therewith. Any suitable photochromic compound may be used, such as, but not limited to, spirooxazines, fulgides, fulgimides, naphthopyrans, mixtures thereof and the like.

The polarized film used in the present invention is preferably made of polyvinyl alcohol according to process well known to those skilled in the art.

The adhesive may be any suitable adhesive material known to those skilled in the art for bonding polycarbonate, such as, but not limited to, adhesives #3103, #3201, #3211, #3301, #3311, #3321, #3341, and/or #3381 available from Loctite® (Rocky Hill, Conn., USA). Such adhesives may be one component, thixotropic adhesives which cure rapidly to form flexible, transparent bonds when exposed to ultraviolet radiation and/or visible light of sufficient intensity. Materials suitable for use as the first adhesive 26 and the second adhesive 28 must have good optical properties, including high optical transparencies, no yellowing upon exposure to sunlight, an ability to flex during injection molding without becoming crazed, minimal shrinkage during curing, and must meet the aforementioned material compatibility requirement. Some additional examples of suitable materials for the adhesive include, but are not limited to, acrylic-type, epoxy-type and urethane-type adhesives, such as Loctite® FMD-207, Loctite® FMD-338, Loctite® FMD-436, and Loctite® 3311, each available from Loctite Corporation of Rocky Hill, Conn.; Norland Optical Adhesive Type 68 available from Norland Products. Inc. of New Brunswick, N.J.; and Summers Laboratories Type SK-9 available from Summers Laboratories, Inc. of Collegeville, Pa. The materials used for the adhesive may be curable by thermal treatment or by treatment with ultraviolet light.

The lenses made according to the present invention may optionally be treated with a surface coating using materials and methods known to those skilled in the art to improve hardness. The lenses may also optionally be treated with an anti-reflective coating or a mirror coating using materials and methods known to those skilled in the art to improve optical performance.

Corona discharge is a discharge, frequently luminous, at the surface of a conductor or between two conductors of the same transmission line, accompanied by ionization of the surrounding atmosphere. Corona discharge is basically plasma that is in a transient, formative phase.

In a corona discharge process, the plastic is exposed to a corona discharge, usually in the presence of air (oxygen) and at atmospheric pressure. This roughens the surface, which provides sites for mechanical interlocking, and introduces reactive sites on the surface of the plastic, consequently increasing the wettability and reactivity of the surface. The reactive functionalities which are theorized to be introduced to the surface may include, but are not proven to be, carbonyl, hydroxyl, hydroperoxide, aldehyde, ether, ester, and carboxylic acid groups, as well as unsaturated bonds.

The glass mold is the mold used to form the lens front side of the polarized lens. Thus, the glass mold design will generate different lenses, such as, but not limited to, single vision lens, bifocal lens, progressive lens, multi-focal lens, combinations thereof and the like. The glass molds can be designed and purchased from commercial glass mold suppliers. Accordingly, any of these types of lenses can be produced according to the method of the present invention.

The primer coat material may be a mixture of "A" 2-butanone ($CH_3COC_2H_5$) and "B", a mixture of tris(phenyl-isocyanate)thiophosphate ($S=P(O-CH_2-NCO)_3$, $C_6H_4$), ethyl acetate and chlorobenzene. See CAS No. 78-93-8, which is incorporated by reference herein. A mixture (by weight) of from about 60:1 to about 65:1, more preferably about 60:1 A:B can be used. Mixing may be done at room temperature or at a range of about 18–28 degrees C. Preferably, relative humidity is in a range of about 30–50%. Stirring may be done for approximately 5 min.

When the lens is dipped in the primer coat material, the faster the lift up speed, the thinner the coating; conversely, the slower the lift up speed, the thicker the coating. The preferred lift up rate is by lifting the total polarizer (about 10 cm in diameter) from immersion to being clear of the solution over a period of about 120–180 seconds, more preferably, about 150 seconds.

With respect to the electrical discharge, preferably an ion (plasma) stream generated by a high voltage source is applied to the surfaces to be glued. In one example, an electrical discharger with corona spray is directed for about 3–5 seconds on the surface of a polycarbonate lens and the polarizer. In another example, ion gun discharge inside a vacuum chamber is directed to the surfaces.

The hard coating solution may be any of a number of suitable solutions such as, but not limited to, those commercially available as TS-56™ from Tokuyama Co. (Japan), Titan or Skyward of Groupe Couget Optical Co. (France), ST11™ available from LG Chem., (Korea), Hard Coatings™ from Nippon NRC Co. (Japan), or other solutions known to those skilled in the art.

Manufacturing Process

1. Preparation
   a. Apply an electrical discharge to both sides of the PVA polarized film. The electrical discharge unit may be, for example, a corona treating system available commercially as MultiDyne™ from Tech Sales Company, Ontario, Canada. The distance from the corona head to the substrate is about 5–15 cm. It is to be understood that greater or lesser distances may be used depending on various conditions.
   b. Dip polarized film into the adhesive glue and dry it in a low temperature, humidity and pressure. The result is a PVA glued card (3) (see FIG. 1).
   c. Apply an electrical discharge to the front side of polycarbonate lens (1) under appropriate conditions.

2. Manufacturing
   a. Place the glass mold II (6) back side up. Overlap the PVA glue card (3) on the mold along with the mold back curve (6). Drop glue (2) at the center of the PVA glued card (3) and then overlap polycarbonate lens (1) on the PVA glued card (3) and press properly.
   b. Move the whole set (PVA glued card+polycarbonate lens (1),(2),(3) and (6)) onto the photo-chemical reaction process.
   c. Dismount the lens unit from the glass mold (6), a set of back side "Lens Unit" is completed (which is used as mold I).
   d. Place a new glass mold II (6) front side down, without touching the back side of the glass mold II (6).
   e. Pour monomer (4) or (5) to the backside of the glass mold II (6).
   f. Overlap the above-mentioned "Lens Unit" mold I front side down properly on the glass mold II (6).
   g. Move the whole set of components to the oven for polymerization as per controllable program. An adequate polymerization of monomers (including, but not limited to photochromic monomer) consists mainly of the bridge structure to bond with other different plastic materials.

h. Cool down the polymerized lens according to the program to form a solid lens.
i. Separate the polycarbonate polarized/photochromic lens from the glass mold II (6). A further few hours of thermal curing and drying may be required. A finished polycarbonate polarized/photochromic lens results.
j. Optionally, a hard coating (also known as an anti-scratch coating) (7), known to those skilled in the art, can be applied to one or both sides of polycarbonate polarized lens. Hard coating increases lens hardness, maintains lens clarity and extends the useful life of polarized lens.
k. Optionally, an antireflective coating or mirror coating, known to those skilled in the art, can be applied to one or both sides of polycarbonate polarized lens. An anti-reflective coating increases light transmission, reduces glare and reflection light from the lens surface and provides better vision and comfort to the lens wearer.

While not wishing to be bound by any particular theory, it is believed that the adhesion reaction produces urethane, which causes the PVA film to adhere to the polycarbonate monomer. The performance of isocyanate contained in the primer coat solution composes the unification of PVA and polycarbonate by polymerization through UV radiation and heat, i.e., a coating/adhesive monomer, rather than a glue.

Advantages

The polycarbonate polarized lens of the present invention has improved optical quality (since the polarized film is precisely positioned along with the front curve of polycarbonate lens), less inner stress (the polarized film is not inserted within the lens in casting), and obviates the needs to use back glass molds in casting. The method of the present invention provides the capability to apply hard coating and/or anti-reflection coating to the lens formed. The invention provides an innovative method for manufacturing polarized and/or photochromic lens with polycarbonate and other thermoplastic and thermosetting plastics materials in one process independent of conventional laminating methods (sandwich method) or any other device in both the direct injection and casting. Another advantage is that the method of the present invention can produce photochromic polycarbonate lenses with or without polarization. The present invention provides a novel method for manufacturing photochromic polycarbonate lens in one process independently of Trans-Bonding™ technology. Conventional methods using high temperature molding destroy the photochromic dye activation function.

The invention will be further described in connection with the following examples, which are set forth for purposes of illustration only. Parts and percentages appearing in such examples are by weight unless otherwise stipulated.

EXAMPLES

Preparation

Example 1

(S1) Adhesive glue: Adhesive glue was loaded into an injection tank and the bubbles remove.
(S2) Primer coat solution: 60 parts by weight of a coating material, such as a high boiling acrylate; e.g., aliphatic urethane acrylate oligomer were taken with 1 part modified acrylamide and mixed together by stirring at 21° C. for 5 min. in a sealed environment not exposed to air or oxygen.
(S3) Monomer: Thermosetting monomer (such as CR39, 1.56 etc., available from PPG US or Nihon Yushi Japan) was mixed with an IPP initiator and stored until ready for use at under −20° C.
(S4) The corona discharge was applied.
(S5) Polarized film: The film (available from Talex, TNK, Polateco etc., Japan) was held, preferably using a "no finger touch" device holder with which both sides of the lens or film are exposed to the corona discharge in a clean and safe manner, and the outside surfaces exposed steadily to a corona discharge unit (MultiDyne™ corona treating system, available from Tech Sales Company) at a distance of about 5–15 cm from the surface for 3 seconds. The film was stored in an anti-dust, temperature and humidity controlled container for not longer than 20 min.
(S6) The resulting polarized film (S5) was held at a 90 degree angle and dipped into the primer coat solution (S2) for 2.5 minutes without vibration or wind. This was then dried in a clean room at room temperature for 8 hours at a relative humidity of less than 40% and stored in an anti-dust, temperature and humidity controlled container. Preferably, the drying area has filtered air laminar flow for "windy dry." A positive air pressure is preferred to prevent inflow of contaminated air.
(S7) Polycarbonate lens: The lens material (available from American Polylite) has maintained on a shelf and the lens front surface exposed to a steady corona discharge source for 7 sec. The material was stored in an anti-dust, temperature and humidity controlled container for 20 min.
(S8) The molds were cleaned and dried.

Production of the Lens

Example 2

(P1) Glue injection: The glass mold II (S8) was placed at a holder stand with the front side downward. The PVC glued card (S6) was overlapped at 180 degrees on the glass mold and 0.8 gram of glue was injected at generally the center of the PVC glued card. The polycarbonate lens (S7) was overlapped onto the PVC glued card and the lens pressed until glue was evenly distributed and applied.
(P2) Radiation: The glued lens (P1) was cured on the convex side for 3 minutes and concave side for 3.5 minutes.
(P3) Monomer injection: The new glass mold II (S8) was placed in a holder stand, front side downward. 2.7 gram of (S3) monomer was injected onto the glass mold (S8). the radiation cured lens (P2) was overlapped on top and maintained horizontally and kept horizontally in an oven tray.
(P4) Polymerization: The lens (P3) was polymerized in an oxygen-free oven for 18 hours as per a controllable program.
(P5) Separation and Drying: The polymerized lens (P4) was taken from the oven, separated from the glass mold II and cured at least for further 2 hours.
(P6) Inspection: Lens quality was inspected per normal ophthalmic lens standards.
(P7) Edging and marking: The chips were cleaned at the edge of the lens. A 180° line or similar indication was marked thereon to enable user to identify the position.
(P8) Hard coating: The lens was clean and dried. It was dipped into a hard coating solution, such as that commercially available as TS-56™ from Tokuyama Co. (Japan), Titan or Skyward of Groupe Couget Optical Co. (France), ST11™ available from LG Chem., (Korea), Hard Coatings™ from Nippon NRC Co. (Japan), or other solutions known to those skilled in the art. The hard coated lens was cured in an oven or UV cured. Lens quality was inspected.
(P9) Package and label the lens.

FIG. 6 shows a flow diagram of the example with material being in solid boxes, preparation process steps being in dashed boxes, and manufacturing processes being in double line boxes.

Example 3

Examples for glue curing at radiation.

Note: Curing factors (distance, power and time) are changeable provided the total curing energy second-mwatt/cm$^2$ is enough. UV light: A commercially available UV light with major wavelength between about 340–400 nm was used. Metal halide: A commercially available metal halide lamp with major wavelength between about 365–420 nm was used. The light boxes were installed with hot air exhaust to prevent the polarizer from being damaged (should be less than about 100 degrees Celsius).

Table 1 below shows the experiment number, procedure and final cure details.

TABLE 1

| Exper. No. | Precure | Final cure |
|---|---|---|
| 1 | Step 1. One 150 W UV light (15 cm far) from polarizer side for 20 sec.<br>Step 2. Two 20 W UV light (15 cm far) from PC lens side for 20 sec. or longer | Step 1. 300 W UV light (15 cm far) from PC lens side for 3 minutes<br>Step 2. 300 W UV light (15 cm far) from polarizer side for 3.5 minutes<br>(Or do step 2 before step 1) |
| 2 | Simultaneously, do both steps 1 and 2 of Ex. 1. | Simultaneously, do both steps 1 and 2 of Ex. 1. |
| 3 | Step 1. One 150 W UV light (10 cm far) from polarizer side for 10 sec.<br>Step 2. Two 20 W UV lights (10 cm far) from PC lens side for 10 sec. or longer | Step 1. 300 W UV light (10 cm far) from PC lens side for 1.5 minutes<br>Step 2. 300 W UV light (10 cm far) from polarizer side for 2 minutes<br>(Or do step 2 before step 1) |
| 4 | Simultaneously, do both steps 1 and 2 of Ex. 3 | Simultaneously, do both steps 1 and 2 of Ex. 3 |
| 5 | Step 1. Two 20 W UV lights (15 cm far) from PC lens side for 20 sec.<br>Step 2. Two 20 W UV lights (15 cm far) from polarizer side for 20 sec. | Step 1. 150 W metal halide bulb (10 cm far) from PC lens side for 2 minutes<br>(Radiation from polarizer side is not necessary) |
| 6 | Step 1. Two 20 W UV lights (15 cm far) from PC lens side for 20 sec.<br>Step 2. Two 20 W UV lights (15 cm far) from polarizer side for 20 sec. | Step 1. 150 W metal halide bulb (12 cm far) from PC lens side for 2.5 minutes<br>(Radiation from polarizer side is not necessary) |
| 7 | Not necessary | Step 1. 150 W metal halide bulb (15 cm far) from PC lens side for 7 minutes<br>(Radiation from polarizer side is not necessary) |
| 8 | Not necessary | Step 1. 150 W metal halide bulb (10 cm far) from PC lens side for 4 minutes<br>(Radiation from polarizer side is not necessary) |
| 9 | Cure with conveyer device with 3.0~8.4 kW metal halide lamp may shorten the process time to within seconds. | |

Example 4

(P4) Monomer Polymerization

By Heat:

Experiment 1: CR-39 was cured with tested heating programs totaling 18 hours with maximum temperature of 90 degree C.

Experiment 2: Another monomer also workable per their polymerization program.

By UV Light:

Experiment 1: Some monomers like n=1.56 clear or photochromic material, for example, Sunsensor™, can be cured by UV light in 20 minutes, which has shorter process time and reduces the possibility of heat damage to the polarizer.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

It should further be noted that any patents, applications and publications referred to herein are incorporated by reference herein in their entirety.

What is claimed is:

1. A method of producing a polarized polycarbonate ophthalmic lens, comprising:
   a) providing a polarized film having a first and second side;
   b) applying an electrical discharge to both the first and second sides of the polarized film;
   c) applying an adhesive to both the first and second sides of the polarized film and allowing the adhesive to dry;
   d) providing a thermoplastic material lens having a front and back side;
   e) applying an electrical discharge and adhesive to the front side of the thermoplastic material lens, and then applying the polarized film to the front side of the thermoplastic material lens;
   f) curing the adhesive;
   g) applying a thermosetting monomer between the combined thermoplastic material lens and polarized film and a glass mold; and
   h) bonding the thermosetting monomer and the thermoplastic material lens via polymerization to form a polarized polycarbonate lens.

2. A method of producing a photochromic polycarbonate lens, comprising:
   a) providing a thermoplastic material lens having a first and second side;
   b) applying an electrical discharge and adhesive on one of the first and second sides of the thermoplastic material lens;
   c) curing the adhesive;
   d) applying a thermosetting photochromic monomer between the thermoplastic material lens and a front glass mold; and
   e) bonding the thermosetting monomer and the thermoplastic material lens via polymerization to form a photochromic polycarbonate lens.

3. A method of producing a polarized plastic ophthalmic lens, comprising:
   a) providing a polarized film having a first and second side;
   b) applying an electrical discharge to both ihe first and second sides of the polarized film;
   c) applying an adhesive to both the first and second sides of the polarized film and allowing the adhesive to dry;
   d) providing a thermosetting material lens having a front and back side;
   e) applying an electrical discharge and adhesive to the front side of the thermosetting material lens, and then applying the polarized film to the front side of the thermosetting material lens;
   f) curing the adhesive;
   g) applying a thermosetting monomer between the combined thermosetting material lens and polarized film and a glass mold; and
   h) bonding the thermosetting monomer and the thermosetting material lens via polymerization to form a polarized plastic lens.

4. A method of producing a photochromic polarized plastic ophthalmic lens, comprising:
   a) providing a polarized film having a first and second side;
   b) applying an electrical discharge to both the first and second sides of the polarized film;
   c) applying an adhesive to both the first and second sides of the polarized film and allowing the adhesive to dry;
   d) providing a thermosetting material photochromic lens having a front and back side;
   e) applying an electrical discharge and adhesive on the back side of the thermoplastic material lens thermosetting material photochromic lens and then applying the polarizing film to the back side of the thermosetting material photochromic lens;
   f) curing the adhesive;
   g) applying a thermosetting monomer between the combined thermosetting material photochromic lens and polarized film and a glass mold; and
   h) bonding the thermosetting monomer and the thermosetting material lens via polymerization to form a polarized plastic lens.

5. The method of claim 4, wherein the thermosetting material photochromic lens comprises plastic lenses with an index of refraction of 1.499 or 1.56 or 1.60.

6. A method of producing a photochromic polarized polycarbonate ophthalmic lens, comprising:
   a) providing a polarized film having a first and second side;
   b) applying an electrical discharge to both the first and second sides of the polarized film;
   c) applying an adhesive to both the first and second sides of the polarized film and allowing the adhesive to dry;
   d) providing a thermoplastic material photochromic lens having a front and back side;
   e) applying an electrical discharge and adhesive on the back side of the thermoplastic material photochromic lens and then applying the polarizing film to the back side of the thermoplastic material photochromic lens;
   f) curing the adhesive;
   g) applying a thermosetting monomer between the combined thermoplastic material lens and polarized film and a glass mold; and
   h) bonding the thermosetting monomer and the thermoplastic material lens via polymerization to form a polarized polycarbonate lens.

7. A method of producing a polarized polycarbonate ophthalmic lens, comprising:
   a) providing a polarized film having a first and second side;
   b) applying an electrical discharge to both the first and second sides of the polarized film;
   c) applying an adhesive to both the first and second sides to the polarized film and allowing the adhesive to dry;
   d) providing a first thermoplastic material lens having a front and side;
   e) applying an electrical discharge and adhesive to the front side of the thermoplastic material lens, and then applying the polarized film to the front side of the thermoplastic material lens;
   f) curing the adhesive;
   g) providing a second thermoplastic material lens between the combined first thermoplastic material lens and polarized film and a glass mold;
   h) applying an electrical discharge and adhesive on a back side of the first thermoplastic materials lens;
   i) curing the adhesive; and
   j) bonding the first thermoplastic material lens and the second thermoplastic material lens to form a polarized polycarbonate lens.

8. A method of producing a photochromic polycarbonate lens, comprising:
   a) providing a thermoplastic material lens having a first and second side;
   b) applying an electrical discharge and adhesive on one side of the thermoplastic material lens;
   c) curing the adhesive;
   d) providing a thermoplastic photochromic lens between the thermoplastic material lens and a glass mold;
   e) applying an electrical discharge and adhesive on a back side of thermoplastic photochromic lens;
   f) curing the adhesive; and
   g) bonding the thermoplastic photochromic lens and the thermoplastic material lens to form a photochromic polycarbonate lens.

9. The method of claim 1, wherein applying a thermosetting monomer comprises applying a thermosetting photochromic monomer that is bonded to form a polarized photochromic polycarbonate lens.

10. The method of claim 3, wherein applying a thermosetting monomer comprises applying a thermosetting photochromic monomer that is bonded to form a polarized photochromic plastic lens.

11. A method of producing a lens, comprising:
    applying a thermosetting monomer to a back side of a mold structure;
    applying a polymer lens having a polarizing film thereon to the back side of the mold structure such that the thermosetting monomer is between the combined polymer lens and polarizing film and the mold structure; and forming an optical lens by bonding the thermosetting monomer and the combined polymer lens and polarizing film by using solely and only polymerization to make and form the bond therebetween.

12. A method of producing a lens, comprising:

applying a thermosetting monomer to a back side of a mold structure;

applying a polymer lens to the back side of the mold structure such that the thermosetting monomer is between the polymer lens and the mold structure;

bonding the thermosetting monomer and the polymer lens by polymerization to form an optical lens;

applying an electrical discharge to at least one side of the polymer lens;

applying an adhesive to the side of the lens to which the electrical discharge was applied; and bonding a polarized film to the polymer lens via the adhesive.

13. The method of claim 11, wherein applying the polymer lens to the back side of the mold structure comprises applying one of a thermosetting material lens and a thermoplastic material lens.

14. A method of producing a lens, comprising:

applying a thermosetting monomer to a back side of a mold structure;

applying a polymer lens to the back side of the mold structure such that the thermosetting monomer is between the polymer lens and the mold structure; and bonding the thermosetting monomer and the polymer lens by polymerization to form an optical lens, wherein applying a thermosetting monomer comprises applying a thermosetting photochromic monomer.

* * * * *